Jan. 10, 1961 P. E. GRINDROD 2,967,777
METHOD OF PACKAGING FOOD PRODUCTS TO
INHIBIT GROWTH OF MOLDS AND BACTERIA
Filed Oct. 31, 1957
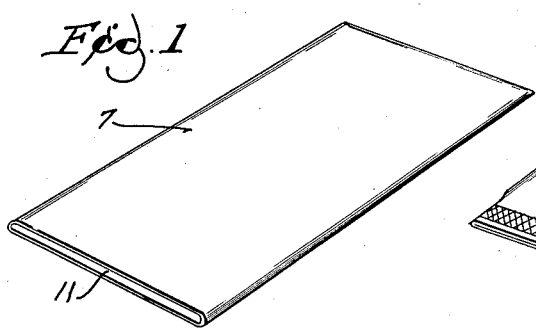
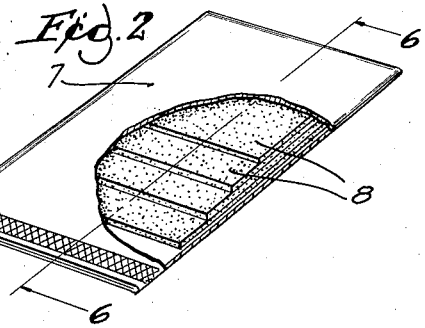
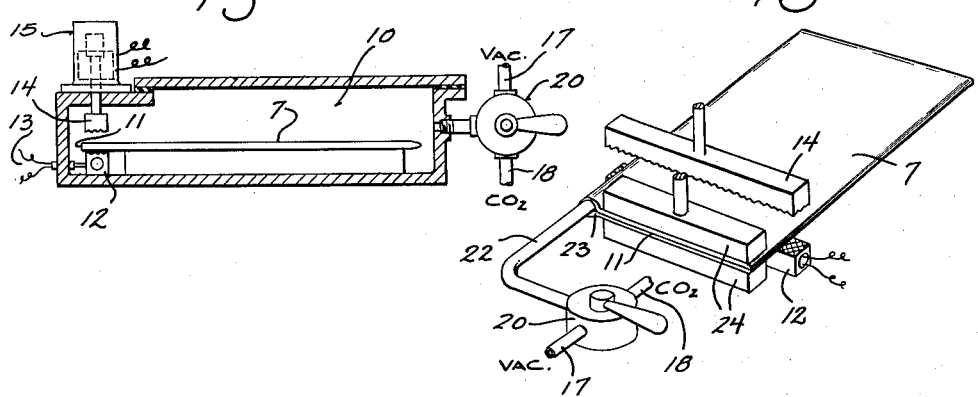
INVENTOR.
PAUL E. GRINDROD
BY
Wheeler, Wheeler & Wheeler
ATTORNEYS

United States Patent Office 2,967,777
Patented Jan. 10, 1961

2,967,777

METHOD OF PACKAGING FOOD PRODUCTS TO INHIBIT GROWTH OF MOLDS AND BACTERIA

Paul E. Grindrod, Portage, Wis.
(1008 Glenview Drive, Madison, Wis.)

Filed Oct. 31, 1957, Ser. No. 693,614

4 Claims. (Cl. 99—178)

This invention relates to a method of packaging food products to inhibit growth of molds and bacteria. The invention has particular reference to the packaging of cheese although it is also applicable to such diverse other products as bread and bacon.

Recently the packaging of presliced cheese in an impervious plastic pouch has gained widespread consumer acceptance. In order to increase the shelf life of the freshly cut cheese and prevent the growth of molds and bacteria, air has been withdrawn from the pouch by subjecting it to vacuum or by flushing the pouch with an inert gas, in either case the pouch being sealed to contain an atmosphere of such gas.

When carbon dioxide is used, the cheese tends to absorb the carbon dioxide to collapse the bag upon the freshly cut surface of the cheese. Adherence of the transparent plastic material to the cheese surface gives the cheese a shiny appearance like that of process or sterilized cheese. This tends to depreciate its value. Accordingly the industry has substituted nitrogen for carbon dioxide, the cheese having less capacity for absorbing nitrogen. The use of nitrogen has introduced different problems, since the capacity of the nitrogen to resist mold and bacteria development is materially less than that of carbon dioxide and requires a more thorough removal of oxygen in order to be satisfactorily effective. Apparently nitrogen is effective only to the extent that it displaces oxygen, whereas carbon dioxide appears to have some additional inhibitory effect.

The present invention is based on the discovery that cheese may be packaged in a flexible envelope without the undesirable adhesion of the film to the cheese and, at the same time, using the advantageous features of carbon dioxide, provided the carbon dioxide is introduced into the envelope under pressure and in predetermined quantities considerably in excess of what is required merely to fill the envelope. Natural cheese evolves carbon dioxide continuously throughout its curing period and carbon dioxide is given off even when the natural cheese is aged. It is believed that the carbon dioxide produced is a product of protein degradation resulting from decarboxylation of protein or protein derivatives in consequence of bacterial-triggered biochemical reactions associated with the curing of the cheese.

As the carbon dioxide is released, it is absorbed by the mixture of the substances which compose the cheese until these substances become saturated. Saturation depends upon various factors including the composition of cheese, the temperature, and the atmospheric pressure.

When cured cheese is cut or subdivided prior to packaging, the cheese becomes warmed slightly and its surface area is increased many fold. As a result of the warming, the cheese becomes super-saturated and gives off carbon dioxide until equilibrium is attained. Subjecting the cheese to a vacuum further reduces its carbon dioxide content. When the cheese is thereafter packaged and cooled, it is unsaturated and will reabsorb carbon dioxide until it becomes saturated under the new conditions of temperature and pressure.

Accordingly in the practice of the present invention, a sufficient volume of carbon dioxide is inserted in the pouch at the time of sealing to exceed slightly the amount required for saturation under merchandising conditions, thus supporting the pouch free of pressure contact with the surface of the cheese. To this end, it has been found commercially acceptable to introduce the carbon dioxide into the pouch at a superatmospheric pressure of about 10 lbs. per square inch, gauge.

Bread packaged in an atmosphere of nitrogen will become moldy in a few weeks whereas the same bread packaged in carbon dioxide under pressure has been kept at room temperature for a period in excess of eight months without developing mold. The bread does not reabsorb carbon dioxide, however. Bacon does reabsorb carbon dioxide, much as does cheese. While it does not necessarily evolve carbon dioxide, as cheese does, it is desirable to use carbon dioxide under pressure when bacon or the like is being packaged according to the present invention.

In the drawings:

Fig. 1 is a view in perspective of a completed package embodying the invention.

Fig. 2 is a view of a portion of the envelope broken away to expose the cheese slices packaged therein.

Fig. 3 is a diagrammatic view in section through a vacuum and pressure chamber and heat sealing apparatus used as one means of carrying out the process.

Fig. 4 diagrammatically illustrates package evacuating and pressurizing and heat sealing means representing an alternate way of producing the invention.

Fig. 5 is a view in cross section through a package newly pressurized with carbon dioxide.

Fig. 6 is a view taken in section on the finished package on line 6—6 of Fig. 2.

The envelope 7 in which the cheese slices 8 are packaged should be substantially nonporous to carbon dioxide. There are Saran films which are suitable. There are also a number of laminated films, one of which comprises cellophane coated on both sides with Saran and then laminated to polyethylene. The rate of gas diffusion through such a laminated film is so low that it becomes significant only when the cheese merchandizing takes from three months to a year or more.

The preferred procedure followed in the practice of the invention involves cutting cold 20 lb. blocks of cured cheese into slices 8 which are about ⅛" thick. Since the slicing is done at room temperature, the slices will be warmed from their original temperature of about 40° F. to some intermediate temperature approaching room temperature.

The desired number of cheese slices are placed in a package or envelope made of plastic wrapping film of the character indicated. By way of example and not by way of limitation, three or four such slices aggregating about 6 ounces in weight are put in a single envelope.

The open-mouthed envelope and its content of the cheese slices to be packaged therein are placed in a vacuum chamber 10 with the open mouth 11 of the package resting on the lower jaw 12 of a heat sealer which has electrical heat connections at 13. A complementary jaw 14 movable to and from jaw 12 may be operated electromagnetically by means of the solenoid 15. Valve 20 is manipulated to connect the chamber with the vacuum line 17 to exhaust the air from the chamber to the approximate vacuum of 28.5" of mercury.

The warming of the cheese and subjecting it to vacuum removes a portion of the carbon dioxide with which the cold cheese was presumably saturated prior to slicing. The outward flow of carbon dioxide is believed to take out most of the oxygen in and at the surface of the cheese slices.

Carbon dioxide is now admitted through the pipe 18 and valve 20 to the chamber 10. In practice the carbon dioxide is admitted under a pressure of 10 lbs. to the square inch. When flow ceases, the heat sealing jaw 14 is closed to jaw 12 upon the intervening mouth 11 of the package 7 thereby sealing the cheese in the envelope in an atmosphere of carbon dioxide under 10 lbs. pressure.

When the package is removed from chamber 10, pressurized carbon dioxide swells the envelope as shown in Fig. 5 but the carbon dioxide is now absorbed into the cheese until the package flattens out to the extent indicated in Fig. 6 and above described, there being just sufficient gas to support the wrapping film free of contact with the surface of the cheese and to give the cheese a freshly wrapped appearance rather than the appearance of process cheese. The volume of gas introduced into the package will depend on the pressure used. Hence, by simply varying the pressure, the package may be given the desired appearance. It will also be necessary to take into consideration the amount of cheese within the package because the amount of gas absorbed in relation to the capacity of the package will depend on the amount of cheese present.

Assuming that the envelope is of a size to receive three or four slices of cheese with a total weight of 6 ounces, the total volume of the envelope 7 when the envelope is in pressure contact with the surface of the cheese as in normal packaging of process cheese will range from 160 to 180 cc. When the envelope is heat sealed to contain a desirable volume of carbon dioxide under pressure to support the wrapping film out of pressure contact with the surface of the cheese (Fig. 5) the volume of the envelope and its contents is approximately 250 cc. If the envelope is filled with an excess of carbon dioxide under pressure, as shown in Fig. 5, the excess gas will fill out the envelope to leave a void above the cheese as shown at 21 and its capacity when filled to this extent may be about 325 cc.

Instead of using a vacuum chamber, it has been found possible to flush the package by jetting carbon dioxide under high pressure into the envelope and heat sealing the envelope while the jet is still directed toward its interior, thereby catching a substantial volume of the gas sufficient to leave the envelope distended when sealed. In operating in this manner, carbon dioxide under pressure of 50 lbs. has been used.

Similarly, but using a vacuum chamber, it has also been found possible to draw a vacuum on the pouch, then to release the vacuum by flushing the package by jetting carbon dioxide under high pressure into the envelope and heat sealing the envelope while the jet is still directed toward its interior, thereby catching a substantial volume of the gas sufficient to leave the envelope distended when sealed. In operating in this manner, carbon dioxide has been used at a pressure of 50 pounds. The pressure developed within the vacuum chamber, however, only slightly exceeds atmospheric pressure.

A third alternative is shown in Fig. 4 wherein the pipe 22 from the valve 20 enters the corner portion 23 of the envelope, the mouth 11 of the envelope being closed at all other points by the elastomeric clamping members 24 which are immediately adjacent the heat sealing jaws 12 and 14. In the use of this apparatus, no vacuum chamber is required, the vacuum being drawn and the pressure developed directly in the envelope, after which the heat sealing jaws 12 and 14 seal the envelope mouth 11.

Using any of these procedures, my method packages the cheese in a quantity of carbon dioxide under pressure which is in excess of that required to saturate the cheese and hence creates an attractive and natural looking package while at the same time inhibiting the growth of mold and bacteria during normal shelf life of the cheese more effectively than is possible with any other gas known to me.

All particulars given are by way of example and not by way of limitation except as included in my claims.

The invention claimed is:

1. A method of packaging cheese in an atmosphere of carbon dioxide in a pouch of material impervious to carbon dioxide and through which the cheese is visible, while preventing the pouch from adhering to the cheese to give it a shiny appearance, said method including subjecting the cheese to vacuum to withdraw its gas content, the cheese being left with a capability for carbon dioxide absorption, and the introduction into the pouch of the cheese to be packaged and a volume of carbon dioxide under superatmospheric pressure which is materially in excess of the volume of carbon dioxide which the packaged cheese is capable of absorbing, and thereafter sealing the pouch about the cheese and carbon dioxide.

2. The method of claim 1 in which the excess of carbon dioxide is just sufficient to keep the material of the pouch from adhering to the surface of the cheese without causing such material to bulge objectionably from the cheese after the cheese has absorbed carbon dioxide to its capacity for such absorption.

3. The method of claim 1 in which the gas is added under pressure sufficient not only to pressure in the approximate amount of 10 lbs. per square inch at the time the pouch is sealed.

4. The method recited in claim 1 in which the carbon dioxide is blown into the pouch and the pouch is sealed while still subject to carbon dioxide blown toward it.

References Cited in the file of this patent

UNITED STATES PATENTS

| Re. 14,489 | Franks | June 25, 1918 |
| 1,591,932 | Young | July 6, 1926 |
| 1,945,669 | Vogt | Feb. 6, 1934 |
| 2,159,835 | Waters | May 23, 1939 |
| 2,304,591 | Pape et al. | Dec. 8, 1942 |
| 2,623,826 | Grinstead | Dec. 30, 1952 |
| 2,753,268 | Ingle et al. | July 3, 1956 |